United States Patent
Pugh et al.

(10) Patent No.: US 7,580,023 B2
(45) Date of Patent: Aug. 25, 2009

(54) COLOR LCD WITH BI-COLOR SEQUENTIAL BACKLIGHT

(75) Inventors: Mark Pugh, Los Gatos, CA (US); Gerard Harbers, Sunnyvale, CA (US); Serge Joël Bierhuizen, Milpitas, CA (US)

(73) Assignee: Philips Lumileds Lighting Co., LLC, San Jose, CA (US)

( * ) Notice: Subject to any disclaimer, the term of this patent is extended or adjusted under 35 U.S.C. 154(b) by 669 days.

(21) Appl. No.: 11/312,679

(22) Filed: Dec. 19, 2005

(65) Prior Publication Data

US 2007/0139352 A1    Jun. 21, 2007

(51) Int. Cl.
G09G 3/36 (2006.01)
(52) U.S. Cl. .............. 345/102; 345/87; 345/88
(58) Field of Classification Search .......... 345/55, 345/82, 83, 84, 87, 102, 88; 349/61
See application file for complete search history.

(56) References Cited

U.S. PATENT DOCUMENTS

| | | | |
|---|---|---|---|
| 6,621,482 B2 * | 9/2003 | Fuller | 345/102 |
| 7,295,180 B2 * | 11/2007 | Ichikawa et al. | 345/102 |
| 2002/0196220 A1 * | 12/2002 | Sato et al. | 345/87 |
| 2004/0105265 A1 * | 6/2004 | Takizawa | 362/293 |

* cited by examiner

Primary Examiner—My-Chau T Tran

(57) ABSTRACT

In an LCD, a backlight having red, green, and blue LEDs is controlled to generate monochromatic light (e.g., blue) during a portion of a cycle, such as an image frame cycle. During another portion of the cycle, all the LEDs are illuminated to create white light. The color filter in the LCD panel contains, for each white pixel, a first color (e.g., red) subpixel filter, a second color (e.g., green) subpixel filter, and a clear subpixel area for passing white light and the monochromatic. The liquid crystal layer shutters are controlled to pass from 0-100% of the light for their associated subpixels to create a color image. With proper control of the shutters, any desired color of each white pixel can be achieved during the cycle. By converting one color filter to a clear area, the transmission efficiency of the display is greatly increased.

20 Claims, 3 Drawing Sheets

COLOR LCD WITH BI-COLOR SEQUENTIAL BACKLIGHT

FIELD OF THE INVENTION

This invention relates to color liquid crystal displays (LCDs) and more particularly to LCDs using a backlight having light emitting diodes (LEDs).

BACKGROUND

FIG. 1 illustrates a typical prior art color, transmissive LCD. The structure of FIG. 1 will be used to identify certain disadvantages of prior art LCDs that are avoided by the present invention.

In FIG. 1, an LCD 10 includes a white light source 12 to provide backlighting for the upper LCD layers. A common source for white light is a fluorescent bulb. Another white light source is a combination of red, green, and blue light emitting diodes (LEDs) whose combined light forms white light. Other white light sources are known. These white light sources must provide substantially homogeneous light to the back surface of the display.

A polarizing filter 14 linearly polarizes the white light. The polarized white light is then transmitted to a transparent thin film transistor (TFT) array 16 having one transistor for each red, green, and blue subpixel in the display. An adjacent set of red, green, and blue subpixels is referred to as a white pixel whose color "dot" is a combination of the three subpixels. If the RGB subpixels are all energized, the dot creates white light. TFT arrays are well known and need not be further described.

Above the TFT array 16 is a liquid crystal layer 20, and above liquid crystal layer 20 is a transparent conductive layer 22 connected to ground. An electrical field across a subpixel area of the liquid crystal layer 20 causes light passing through that subpixel area to have its polarization rotated orthogonal to the incoming polarization. The absence of an electrical field across a subpixel area of the liquid crystal layer 20 causes the liquid crystals to align and not affect the polarization of light. Selectively energizing the transistors controls the local electric fields across the liquid crystal layer 20. Each portion of the liquid crystal layer associated with a subpixel is commonly referred to as a shutter, since each shutter is controllable to pass from 0-100% (assuming a lossless system) of the incoming light to the output of the display. Liquid crystal layers are well known and commercially available.

A polarizing filter 24 only passes polarized light orthogonal to the light output from the polarizing filter 14. Therefore, the polarizing filter 24 only passes light that has been polarized by an energized subpixel area in the liquid crystal layer 20 and absorbs all light that passes through non-energized portions of the liquid crystal layer 20. The magnitudes of the electric fields across the liquid crystal layer 20 control the brightness of the individual R, G, and B components to create any color for each pixel in the displayed image.

Other types of LCDs pass light through only the non-energized pixels. Other LCDs use different orientation polarizers. Some types of LCDs substitute a passive conductor grid for the TFT array 16, where energizing a particular row conductor and column conductor energizes a pixel area of the liquid crystal layer at the cross-point.

The light passing through the polarizing filter 24 is then filtered by an RGB pixel filter 25. The RGB pixel filter 25 can be located at other positions in the stack, such as anywhere below or above the liquid crystal layer 20. The RGB pixel filter 25 may be comprised of a red filter layer, a green filter layer, and a blue filter layer. The layers may be deposited as thin films. As an example, the red filter layer contains an array of red light filter areas defining the red subpixel areas of the display. Similarly, the green and blue filter layers only allow green or blue light to pass in the areas of the green and blue subpixels. Accordingly, the RGB pixel filter 25 provides a filter for each R, G, and B subpixel in the display.

The RGB pixel filter 25 inherently filters out at least two-thirds of all light reaching it, since each filter subpixel area only allows one of the three primary colors to pass. This is a significant factor in the generally poor efficiency of the prior art LCDs. The overall transmissivity of the LCD layers above the white light source 12 is on the order of 4-10%.

It is known to eliminate the RGB filter by sequentially energizing red, green, and blue LEDs in the backlight where the sequencing is synchronized with the control of the red, green, and blue subpixel areas of the liquid crystal layer. In this way, red, green, and blue images are rapidly displayed in sequence to create the appearance of a full color image. However, the current state of the art liquid crystal layers cannot be switched fast enough to avoid flickering and other artifacts, especially if the LCD is to be a television screen.

It is also known to have red, green, blue, and white subpixels in a single white pixel, where the white subpixel does not have any filter. Having a separate white subpixel, whose grayscale is controlled by the liquid crystal shutter, can efficiently be used to control the displayed color saturation. However, having an extra subpixel (i.e., 4 vs. 3) for a single white pixel reduces the resolution of the displayed image and reduces the color-generating areas of the RGB pixels. Further, the liquid crystal layer needs additional drive circuits, resulting in an expensive, customized device.

What is needed is a technique for increasing the efficiency of an LCD without the drawbacks of the prior art techniques.

SUMMARY

An LCD is described where the backlight, having red, green, and blue LEDs, is controlled to generate monochromatic light, by energizing only one color of LEDs, during a portion of a cycle, such as an image frame cycle. During another portion of the cycle, all the LEDs are illuminated to create white light. The color filter in the LCD panel contains, for each white pixel, a first color (e.g., red) subpixel filter area, a second color (e.g., green) subpixel filter area, and a clear subpixel area for passing white light and the monochromatic light. The liquid crystal layer shutters are controlled to pass from 0-100% of the light for its associated subpixel to create a color image.

The combination of colors from the monochromatic portion of the cycle and the white light portion of the cycle can create any color for the white pixel. By converting one color filter area to a clear area, the transmission efficiency of the display is almost doubled compared to a display with an RGB filter.

DETAILED DESCRIPTION

One embodiment of the present invention uses a backlight with RGB LEDs. An LCD uses a white pixel formed of two color subpixels and a "white" subpixel, where there is no color filter for the white subpixel. By using three subpixels for a single white pixel, there is no loss of resolution as compared to a white pixel formed of RGB subpixels. Further, since there is no filter for the white subpixel, the transmission efficiency of the LCD, when producing a white image, is almost double that of the prior art LCD using an RGB filter.

Figure 2:
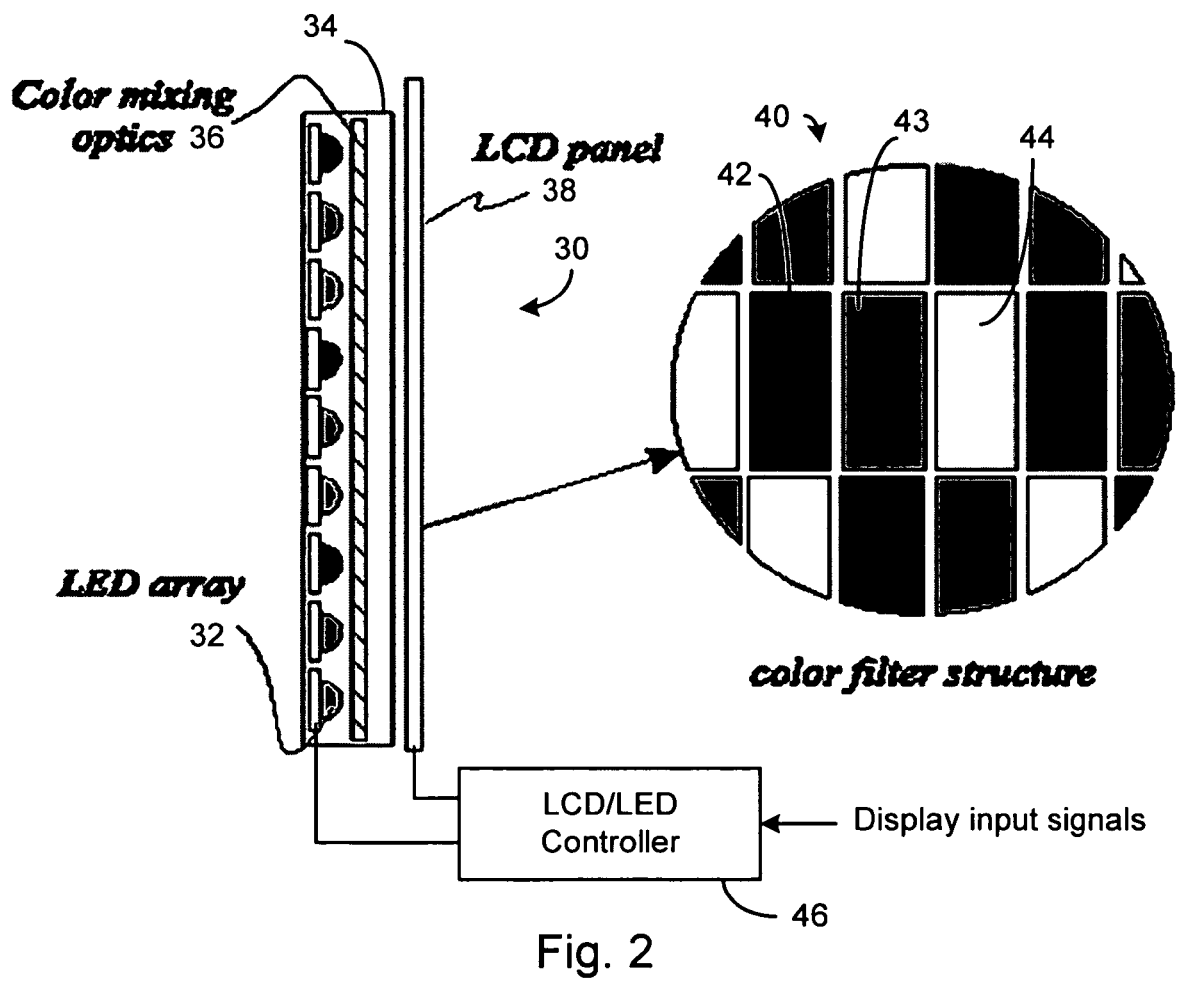
FIG. 2 is a cutaway side view of a simplified LCD in accordance with one embodiment of the invention, along with a close up view of a portion of the color filter.

FIG. 2 is a cutaway side view of an LCD 30 in accordance with one embodiment of the invention. A backlight comprises a two-dimensional array 32 of RGB LEDs mounted in a box 34 with reflective walls and an open top. The walls may be coated with a white paint. Above the LED array 32 is a sheet representing color mixing optics 36. The optics 36 may be a diffuser, such as a plastic sheet with a roughened surface.

Figure 4:
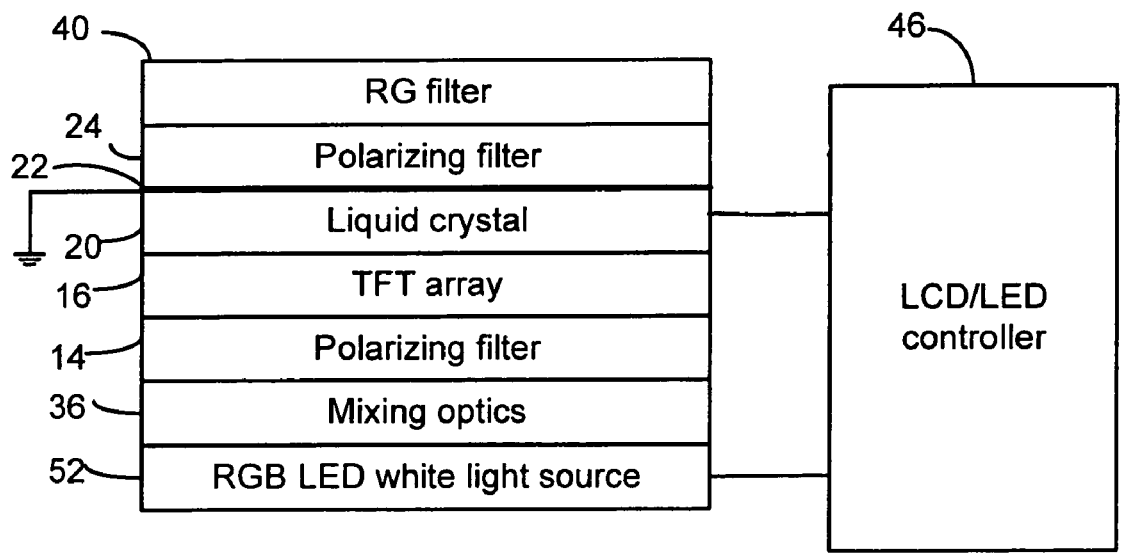
FIG. 4 illustrates an LCD in accordance with one embodiment of the invention.

An LCD panel 38 contains the liquid crystal layer, filter, polarizers, and TFT array, as shown in FIG. 4. A close-up of a portion of the color filter 40 in the LCD panel 38 is shown in FIG. 2. The filter 40 may be a plastic or glass sheet with thin films forming the color filter at each subpixel area. Each white pixel, forming a "single" color dot in the displayed image, is formed of three subpixels. The number of white pixels in the image determines the resolution of the image. The subpixels in a single white pixel are a red subpixel 42, a green subpixel 43, and a blue/white subpixel 44. The filter 40 in the area of the red subpixel 42 ideally passes only red light from the red LEDs in the backlight. The filter 40 in the area of the green subpixel 43 ideally passes only green light from the green LEDs in the backlight. The filter 40 in the area of the blue/white subpixel 44 passes all light generated by the backlight since that portion of the filter 40 is clear.

Actual red and green filters are not perfect and let some small percentage of other color light through. However, the light filtered by a red light filter will appear red to a viewer, and the light filtered by the green filter will appear green to a viewer.

An LCD/LED controller 46 processes incoming display signals, such as television signals, and controls the LCD panel 38 and LEDs as described below.

Figure 3:
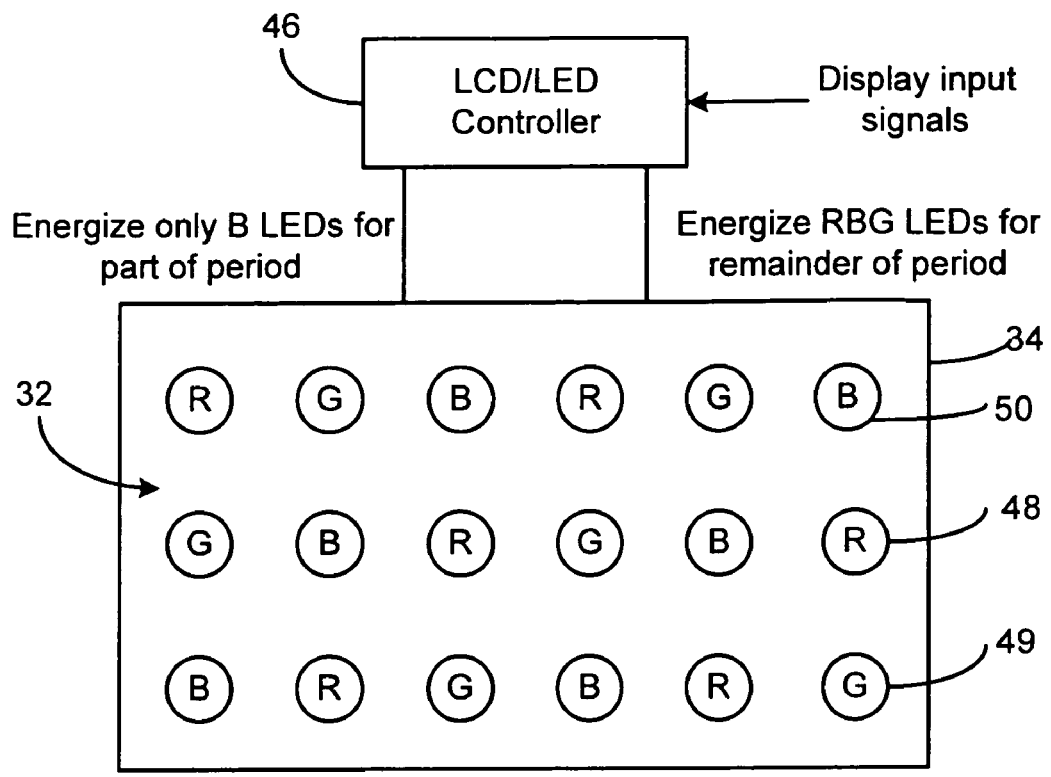
FIG. 3 is a top down view of a backlight with controlled RGB LEDs.

FIG. 3 is a top down view of the backlight box 34 and the RGB LEDs 48, 49, 50, respectively, in the array 32. The relative numbers of LEDs of each color are based on the efficiencies of the particular LEDs and the desired white point. In one embodiment, the ratio is 1R, 2G, 1B. In FIG. 3, the ratios are 1R, 1G, 1B for simplicity. There may be more or less LEDs than shown in FIG. 3 depending on the size of the display.

Figure 1:
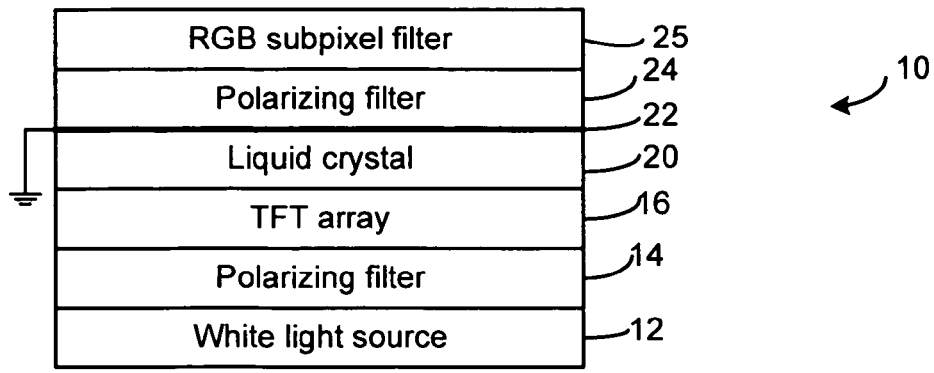
FIG. 1 illustrates a prior art LCD with RGB filters.

FIG. 4 illustrates in more detail the display of FIG. 2. Elements that may be the same as in FIG. 1 are labeled with the same numeral and will not be again discussed. Instead of the RGB filter shown in FIG. 1, only an RG filter 40 is used in the embodiment. The RG filter 40 may be a single sheet with thin film filter areas, or the filter 40 may be two or more sheets, each with a different set of filter areas. The preferred LCD includes the RG filter 40, the polarizer filter 24, and the conductive layer on one side of a front glass plate. A single back glass plate has formed on its surface the TFT array 16 and the polarizing filter 14, and the liquid crystal material is sandwiched between the two glass plates.

In FIG. 4, the backlight is shown as the RGB LED white light source 52 and mixing optics 36.

Figure 5:
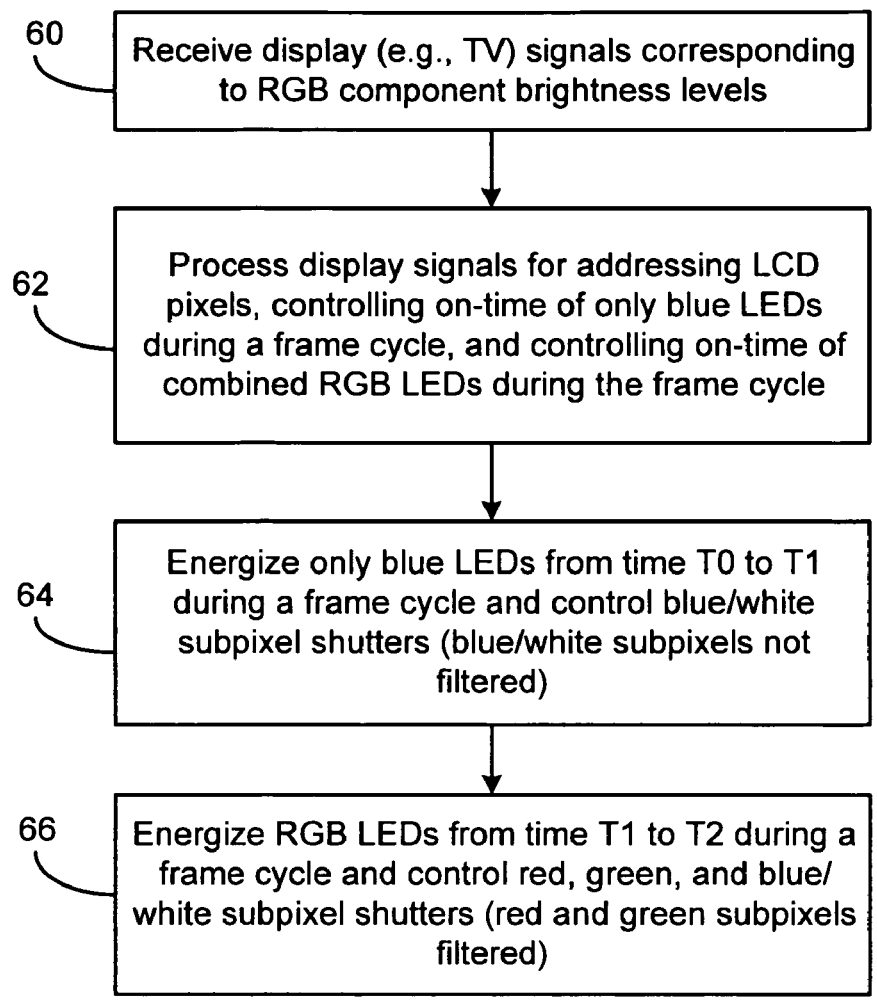
FIG. 5 is a flowchart illustrating a method for controlling an LCD in accordance with one embodiment of the invention.

The LCD is controlled as follows. FIG. 5 is a flowchart of the basic control method.

In step 60, the LCD/LED controller 46 receives display signals corresponding to the brightness levels of the RGB components of each pixel in an image to be displayed. The signals may be television signals, where each image is a frame. There may be 30 frames per second, where each frame is displayed twice to avoid flicker. The changes between frames are perceived as movement. The incoming signal may be in any format, whether analog or digital, and use any encoding scheme.

In step 62, the LCD/LED controller 46 (e.g., one or more programmed processors) processes the incoming signal to determine the appropriate control and addressing signals to apply to the TFT array 16 in order to control the subpixel shutters in the liquid crystal layer 20. The shutters may be controlled in a serpentine fashion, row by row, all at once, or in any other way.

The LCD/LED controller 46 also determines the on-time (T0 to T1 in FIG. 6) of only the blue LEDs 50 in the backlight during a single frame cycle. During this on-time, the red and green LEDs are off. The on-time of the blue LEDs 50 is calculated based on the peak blue value in all the pixels in the image, since any blue value in a pixel above that provided by the blue/white subpixel 44 is only achieved by the blue contribution during the on-time of the blue LEDs only. All of the blue light generated passes unfiltered through the clear portions of the filter 40, a clear portion of the filter is identified as the blue/white subpixel 44 in FIG. 2.

The LCD/LED controller 46 also determines the on-time (T1 to T2 in FIG. 6) of all the RGB LEDs in the backlight during the single frame cycle. This on-time of all the LEDs may occur before or after the blue LED on-time. When all the LEDs are on, the red filter areas only pass red light, the green filter areas only pass green light, and the blue/white filter areas pass the combined RGB white light.

Figure 6:
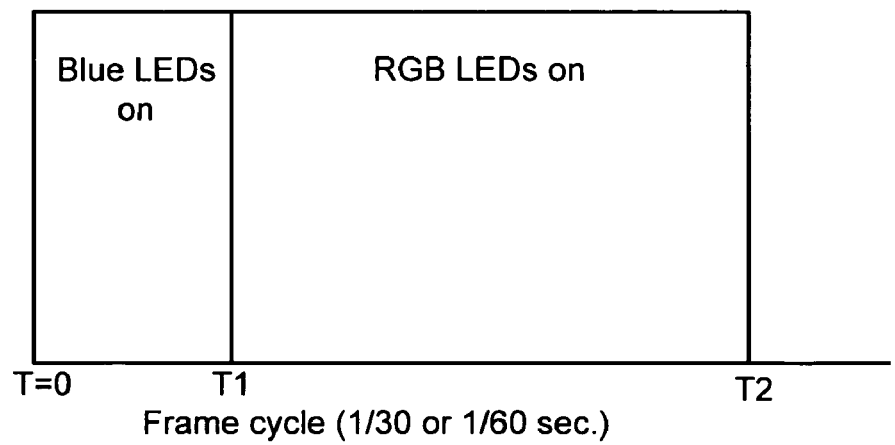
FIG. 6 illustrates sequentially controlling blue LEDs and RGB LEDs in the backlight.

In steps 64 and 66, the calculated control scheme is carried out by the LCD/LED controller 46. In step 64, the controller 46 energizes all the blue LEDs 50 in the backlight for the calculated time T0 to T1, as shown in FIG. 6. During this time, the red and green subpixel areas of the display are dark because the blue light is blocked by the filter 40 in the red and green subpixel areas. Further, the liquid crystal shutters in the red and green subpixel areas may be in a blocking state. The blue/white subpixel shutters in the liquid crystal layer 20 are controlled to pass 0-100% of the blue light depending on the image to be displayed. Controlling the shutters controls the percentage of blue that will be contributed to the white pixel during this portion of the frame cycle. The pixels with the peak blue values should ideally have their shutters open 100% of the time that the blue LEDs are on for maximum efficiency of the LCD. The shutters will be controlled during the time T0-T1 so that the contribution of the blue light during time T0-T1 and the blue component of the white light during time T1-T2 will produce the correct blue content of the pixel during the frame period. Generally, it is best to have the blue LEDs on for a shorter time and have the shutters allow more blue light to pass than have the blue LEDs on for a longer time and have the shutters allow less blue light to pass.

For a less efficient device, but a less computationally intensive device, the duty cycle of the blue light portion of the cycle can be fixed for a "worst case" blue image. Similarly, for a less efficient device, the RGB portion of the cycle can also be a fixed duty cycle.

In step 66, the controller 46 energizes all the RGB LEDs 48-50 in the backlight for the calculated time T1 to T2, as shown in FIG. 6. During this time, the liquid crystal layer 20 is controlled so that each subpixel shutter passes 0-100% of the subpixel's respective color in order to create the image to be displayed. The blue/white subpixel shutters in the liquid crystal layer 20 are controlled to contribute the required portion of white light to the red and green subpixel light to obtain the desired overall color for each white pixel. The control of the blue/white subpixel shutters during this period is affected by the amount of blue light contributed to the white pixel during time T0-T1.

In another embodiment, the time period T0-T2 may create only a portion of an image, such as a subset of the image pixels, and additional one or more cycles are used to create the entire image on the display screen.

As would be understood by those skilled in the art, any color image may be generated by the display using the above-described technique. As a characteristic of human color perception, the subpixel colors in each white pixel over a single frame cycle are mixed together to create a single color white pixel without flicker. A human viewer is unable to perceive the separate portions of the control cycle. The software required for programming the LCD/LED controller 46 is well within the skills of those of ordinary skill in the field of color LCDs.

As would be understood, the LCD/LED controller 46 may represent multiple processors, such as a processor for calculating the control of the liquid crystal layer 20 and LEDs and another processor for carrying out the calculated control. Or the controller 46 may represent one processor for controlling the backlight and another for controlling the liquid crystal layer. Processors having the required capabilities for processing television signals and controlling the LCD of the present invention are commercially sold.

In the above example, the filter 40 has only red and green filters, and the blue filter has been eliminated. Removing the blue filter is attractive, as it is the biggest source of color uniformity errors in the LCD panel, and the characteristics of a blue filter are most sensitive to thickness variations of the filter. So removing the blue filter increases the yield of the filter. Further, blue LEDs have the highest efficiency, even under high current density conditions, so energizing only the blue LEDs for a certain duty cycle increases efficiency of the backlight. Furthermore, saturated blue is a color which does not occur in nature frequently and is mostly required to balance the red and green to get the desired white point of the display.

In other embodiments, the filter may include a combination of any two red, green, and blue filters, with the third subpixel having no filter. The LEDs producing the color not having any filter will be controlled in the same manner as described above with respect to the blue LEDs.

Taking into account the 75%-87% transmission efficiencies of color filters and other factors, the deletion of the blue color filter (or any other single color filter) can result in the transmission efficiency of the display, when displaying white light, being almost double that of a similar display that includes an RGB filter. Increasing the transmission efficiency lowers the cost of the backlight, enables using fewer LEDs, and reduces energy consumption. In one example, the ratio of RBG LEDs can be changed from 1R, 2G, 1B using the prior art method, to 1R, 1G, 1B using the present invention, which improves color uniformity as well as reduces the number of LEDs needed.

Colors of LEDs other than RGB may also be used in the invention to generate white light.

The LCD of FIGS. 2 and 4 may be large screen televisions, such as up to 60 inches across, or small screen displays such as in cell phones, small TVs, or in any portable device having a color display. The LCD may be used to create moving pictures, still pictures, or any other information.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A liquid crystal display (LCD) comprising:
    a backlight, the backlight containing at least three colors of light emitting diodes (LEDs), the LEDs comprising one or more first color LEDs, one or more second color LEDs, and one or more third color LEDs;
    a liquid crystal (LC) layer, the LC layer controlling passing of light from the backlight to an output of the LCD by controlling the passing of light through subpixels;
    a color filter, the filter having subpixel areas, the subpixel areas comprising first subpixel areas for passing light of mainly the first color, second subpixel areas for passing light of mainly the second color, and third subpixel areas for passing all light generated by the backlight,
    each single pixel in the LCD consisting of a group of only a single first subpixel area, a single second subpixel area, and a single third subpixel area, each single pixel generating a color that is a combination of light from the single first subpixel area, the single second subpixel area, and the single third subpixel area; and
    a first controller for illuminating only the third color LEDs in the backlight for a first time period, and illuminating all the LEDs in the backlight for a second time period.

2. The LCD of claim 1 further comprising a polarizer, the polarizer and the color filter being formed on a single sheet.

3. The LCD of claim 1 wherein the LC layer is located between the backlight and the filter.

4. The LCD of claim 1 further comprising a second controller for controlling the LC layer to selectively pass light through the subpixel areas, the second controller being synchronized with the first controller.

5. The LCD of claim 4 wherein the second controller is synchronized with the first controller such that light passing through the subpixels over the first time period and the second time period combine to create a single perceived color for each pixel in the LCD.

6. The LCD of claim 5 wherein the first time period occurs before the second time period.

7. The LCD of claim 5 wherein the first time period occurs after the second time period.

8. The LCD of claim 5 wherein the first time period is adjusted based on a peak value of the third color in a displayed image.

9. The LCD of claim 4 wherein the first controller and the second controller are a single processor.

10. The LCD of claim 1 wherein the first color is red, the second color is green, and the third color is blue.

11. The LCD of claim 1 wherein the LCD is a television.

12. The LCD of claim 1 further comprising a first polarizer, a thin film transistor array, and a second polarizer, the first polarizer and thin film transistor array being located on a first side of the LC layer, the second polarizer and color filter being located on a second side of the LC layer.

13. A method for controlling a liquid crystal display (LCD), the LCD comprising a backlight, the backlight containing at least three colors of light emitting diodes (LEDs), the LEDs comprising one or more first color LEDs, one or more second color LEDs, and one or more third color LEDs, the LCD further comprising a liquid crystal (LC) layer, the LC layer controlling passing of light from the backlight to an output of the LCD by controlling the passing of light through subpixels, the LCD further comprising a color filter, the filter having subpixel areas, the subpixel areas comprising first subpixel areas for passing light of mainly the first color, second subpixel areas for passing light of mainly the second color, and third subpixel areas for passing all light generated by the backlight, each single pixel in the LCD comprising a first subpixel area, a second subpixel area, and a third subpixel area, each single pixel generating a color that is a combination of light from the first subpixel area, the second subpixel area, and the third subpixel area, the method comprising:

energizing only the third color LEDs in the backlight for a first time period;

controlling the LC layer to selectively pass light through the third subpixel areas during the first time period;

energizing all the LEDs in the backlight for a second time period; and controlling the LC layer to selectively pass light through the first, second, and third subpixel areas during the second time period, the controlling the LC layer during the first time period and the second time period creating image pixels, each image pixel creating a combination of light from the first, second, and third subpixels during the first and second time periods so as to create a combined color over the first and second time periods.

14. The method of claim 13 wherein an image created by the LCD over the first and second time periods is a still image.

15. The method of claim 13 wherein an image created by the LCD is a frame, wherein multiple frames create a moving image displayed by the LCD, the first time period and the second time period constituting an entire frame or portion of a frame.

16. The method of claim 13 further comprising determining a peak value of the third color in an image to be created, wherein energizing only the third color LEDs in the backlight for a first time period comprises energizing only the third color LEDs in the backlight for a first time period based on the peak value of the third color in an image to be created.

17. The method of claim 13 wherein the first time period occurs before the second time period.

18. The method of claim 13 wherein the first time period occurs after the second time period.

19. The method of claim 13 wherein the first color is red, the second color is green, and the third color is blue.

20. The method of claim 13 further comprising:

receiving television signals; and processing the television signals to control the backlight and the LC layers to create television images on the LCD.

\* \* \* \* \*